(12) United States Patent
Siddiqui

(10) Patent No.: US 9,018,285 B2
(45) Date of Patent: Apr. 28, 2015

(54) ARABIAN ASPHALTENE REINFORCED POLYSTYRENE COMPOSITES

(71) Applicant: King Fahd University of Petroleum and Minerals, Dhahran (SA)

(72) Inventor: Mohammad Nahid Siddiqui, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/023,445

(22) Filed: Sep. 10, 2013

(65) Prior Publication Data

US 2015/0073090 A1    Mar. 12, 2015

(51) Int. Cl.
    *C08K 5/34*    (2006.01)
    *C08L 95/00*   (2006.01)
    *C08L 25/06*   (2006.01)

(52) U.S. Cl.
    CPC ..................... *C08L 25/06* (2013.01)

(58) Field of Classification Search
    USPC .......................................................... 524/90
    See application file for complete search history.

(56) References Cited

U.S. PATENT DOCUMENTS

2012/0238669 A1    9/2012    Bowen, III
2013/0040520 A1    2/2013    Bohnert et al.

FOREIGN PATENT DOCUMENTS

SU    1381136    *  3/1988    ............... C08K 5/01

OTHER PUBLICATIONS

Abstract of SU 1381136, Mar. 15, 1988.*
M. Khammar and J.M. Shaw,, "Liquid-Liquid Phase Equilibria in Asphaltene + Polystyrene + Toluene Mixtures at 293 K" Energy Fuels(2012), vol. 26(2), pp. 1075-1088 (Abstract only).
Leon-Bermudez et al., "Synthesis and Characterization of the Polystyrene- Asphaltene Graft Copolymer by FT-IR Spectroscopy", Ciencia, Tecnologia y Futuro (2008) vol. 3, No. 4, pp. 157-167.

\* cited by examiner

*Primary Examiner* — Hui Chin
(74) *Attorney, Agent, or Firm* — Richard C Litman

(57) ABSTRACT

The Arabian asphaltene reinforced polystyrene composites include a matrix of polystyrene and an asphaltene filler isolated from Arab heavy crude oil residue that is distributed within the polystyrene matrix to form the Arabian asphaltene reinforced polystyrene composite. Asphaltenes are obtained from the Arab crude oil by precipitation in n-heptane. Styrene monomer and the asphaltenes filler are polymerized by using heat to initiate in situ polymerization. Testing shows that the asphaltene reinforced polystyrene composites have improved viscoelastic properties (e.g., flexural strength) and thermal stability.

7 Claims, 5 Drawing Sheets

ARABIAN ASPHALTENE REINFORCED POLYSTYRENE COMPOSITES

BACKGROUND OF THE INVENTION

1. Field of the Invention

The present invention relates to polymer compositions, and particularly to Arabian asphaltene reinforced polystyrene composites.

2. Description of the Related Art

Polystyrene is a commonly used petroleum-based plastic polymer made from the petrochemical monomer styrene. Polystyrene and polystyrene composites have several applications and can be found in many places, including in the building industry, shipping industry, retail industry, and the food industry, among others. Common uses in these industries may come in the form of home insulation, packing containers and materials, and disposable plates and cutlery, for example.

Polystyrene is a solid at room temperature, and while it is hard, it is also brittle, lacking mechanical strength. Many materials have been used as fillers and reinforcements to form polystyrene composites having increased mechanical strength compared to pure polystyrene. However, there is still a need for reinforced polystyrene composites having a good combination of mechanical strength, viscoelastic properties, and thermal stability.

Thus, Arabian asphaltene reinforced polystyrene composites solving the aforementioned problems are desired.

SUMMARY OF THE INVENTION

The Arabian asphaltene reinforced polystyrene composites include a matrix of polystyrene and an asphaltene filler isolated from Arab heavy crude oil residue that is distributed within the polystyrene matrix to form the Arabian asphaltene reinforced polystyrene composite. Asphaltenes are obtained from the Arab crude oil by precipitation in n-heptane. Styrene monomer and the asphaltenes filler are polymerized by using heat to initiate in situ polymerization. Testing shows that the asphaltene reinforced polystyrene composites have improved viscoelastic properties (e.g., flexural strength) and thermal stability.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
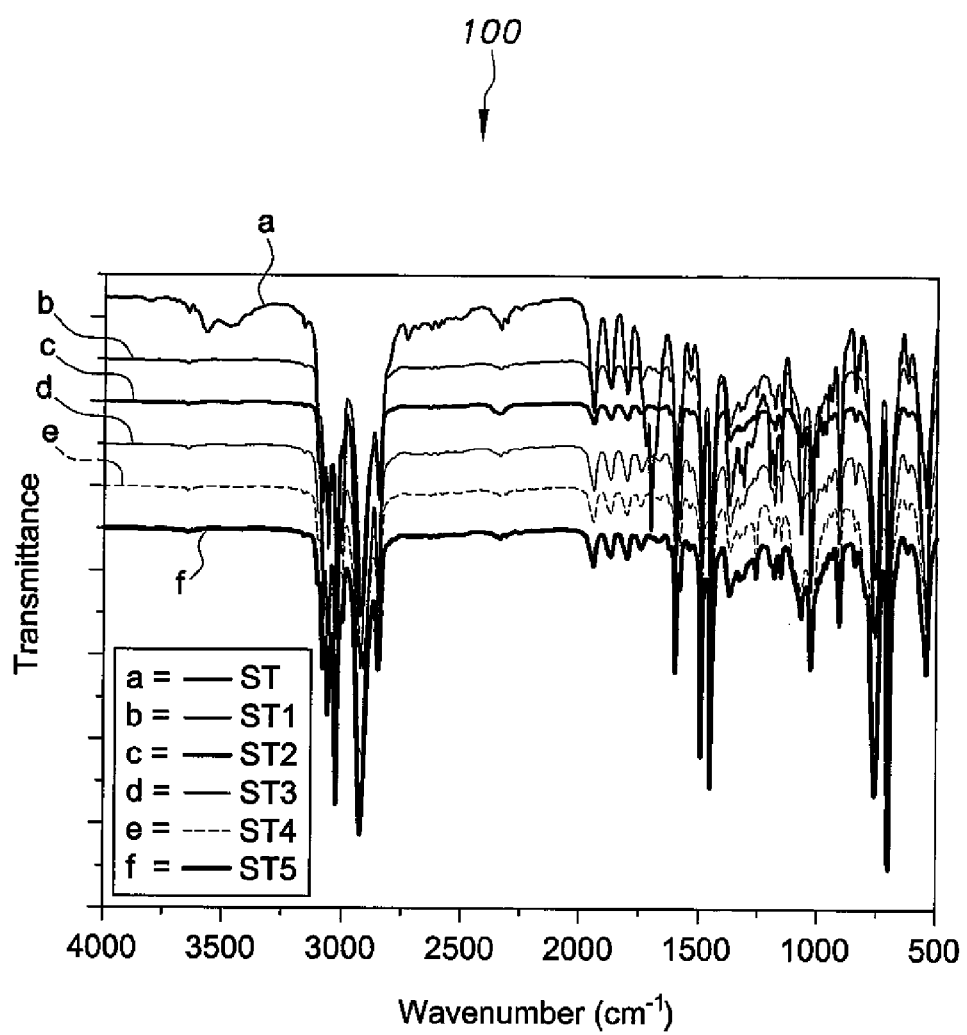
FIG. 1 is the superimposed infrared spectra of pure polystyrene and samples of Arabian asphaltene reinforced polystyrene composites according to the present invention at different filler concentrations.

The Arabian asphaltene reinforced polystyrene composites include a matrix of polystyrene and an asphaltene filler isolated from Arab heavy crude oil residue that is distributed within the polystyrene matrix to form the Arabian asphaltene reinforced polystyrene composite. Asphaltenes are obtained from the Arab crude oil by precipitation in n-heptane. Styrene monomer and the asphaltenes filler are polymerized by using heat to initiate in situ polymerization. Testing shows that the asphaltene reinforced polystyrene composites have improved viscoelastic properties (e.g., flexural strength) and thermal stability.

The present polystyrene composites have a filler of asphaltenes isolated from Arabian crude oil. Asphaltenes are complex molecular mixtures or components found in crude oil that are insoluble in n-heptane and soluble in toluene. There is no agreed upon formula or molecular weight for asphaltenes, and there is some controversy as to whether asphaltenes are properly classified as solids or liquids. Asphaltenes are thought to be mainly composed of polyaromatic carbon rings including heteroatoms of oxygen, nitrogen, and sulfur, as well as trace amounts of metals, especially vanadium and nickel. Asphaltenes are colloidal dispersions in crude oil amounting to mass fractions between 0% and 10%, and sometimes more. Since asphaltenes are derived from crude oil, and since the composition of crude oil is known to vary from one regions to another, the present polystyrene composites are described particularly as including Arabian asphaltenes (i.e., asphaltenes derived from Arabian crude oil), although asphaltenes derived from crude oil of other regions (the North Sea, Indonesia, etc.) may also exhibit the same properties when used as a filler in polystyrene composites as described herein. Arabian crude oil may be considered as crude oil extracted from the Middle East region of the world, including such countries as Saudi Arabia.

The following examples illustrate the preparation and the properties of the Arabian asphaltene reinforced polystyrene composites.

Example 1

Isolation of Asphaltenes

About 10 g of Arabian heavy crude oil residue was transferred to a 100 ml beaker and heated with a very small amount of n-heptane in order to homogenize the solution. This residue solution was transferred to a 1 L flask and 300 ml of n-heptane was added to the flask. The flask was fitted with a magnetic stirrer and placed in a water bath. The residue solution was heated at 90° C. with continuous stirring for about 2 hours in order to maximize the solubility of the residue in n-heptane. After two hours of heating and stirring, the flask was covered with aluminum foil and allowed to cool at room temperature for about 24 hours. The long cooling time promotes more efficient precipitation of asphaltenes in the n-heptane. The residue solution was filtered using a Millipore filtration apparatus with 0.8 μm (37 mm) pore size filter paper. All filtered asphaltene was collected in a 100 ml beaker and washed several times with small portions of n-heptane until the washings became colorless in order to remove any traces of maltenes. The recovered asphaltenes were dried in an oven for about 2 hours at 105° C. to obtain a constant weight.

Example 2

Synthesis of Reinforced Polystyrene Composites

Styrene monomer and the asphaltenes isolated in Example 1 were added to a reaction vessel. The mixture was heated at 120-130° C. to initiate polymerization with continuous stirring in order to disperse the asphaltene among the styrene monomers homogenously. After a sufficient period of time, heat was removed and polymerization was quenched. Five different composites were prepared by in situ polymerization in this manner, the composites differing in the amount of asphaltene filler, as given in Table 1. Although the example recited herein takes advantage of the ability of the styrene monomer to propagate polymerization initiated by heating the monomer, it will be understood that other methods of in situ polymerization may be used, e.g., mixing the styrene monomer and asphaltene filler in a suitable solvent (e.g., toluene, methylene dichloride, etc.), adding a free radical initiator (e.g., benzoyl peroxide), heating with stirring, quenching polymerization (e.g., with methanol), and obtaining the composite by filtration or evaporation of the solvent.

TABLE 1

Preparation of different composites

| Sample | Styrene | Asphaltenes |
|---|---|---|
| ST | Pure | None |
| ST1 | 5 ml | 2.0 mg |
| ST2 | 5 ml | 5.0 mg |
| ST3 | 5 ml | 7.5 mg |
| ST4 | 5 ml | 9.0 mg |
| ST5 | 5 ml | 10.0 mg |

The samples were characterized by FT-IR, TGA, DSC, and DMA techniques, as described in the following examples.

Example 3

FT-IR Testing

A Perkin-Elmer Spectrum One instrument was used for FT-IR studies of the samples listed in Table 1. The chemical structure of the neat polystyrene and the polystyrene composites were confirmed by recording their IR spectra. The resolution used was 4 cm$^{-1}$. The recorded wave number range was from 4000 to 400 cm$^{-1}$, and 32 scans were averaged to reduce noise. Thin films were used in each measurement, formed by a hydraulic press. The superimposed FTIR spectra are shown in FIG. 1, in which samples ST through ST5 are identified as spectra a through f, respectively. The FTIR of the sample composites a through f show the asymmetric stretching vibrations of —CH$_3$ groups are present in the wavenumber region of about 2985-2994 cm$^{-1}$. The symmetric stretching vibrations of the —CH$_3$ group appear to overlap with the stretching vibrations of the —CH$_2$ group in the region of about 2952-2862 cm$^{-1}$. The intensity of the signal at 2869 cm$^{-1}$ is very high and may be caused by the aliphatic side chain of asphaltenes. The Infrared (IR) absorption peaks for these sample composites in the wavenumber region of about 2845-2852 cm$^{-1}$ may result from the symmetric stretching vibrations of the —CH$_2$ group. The absorption band in the region of about 1451-1443 cm$^{-1}$ may result from the bending vibrations of the —CH$_3$ group, and the bending vibrations of —CH$_2$ group were found in a slightly higher region in the IR absorption spectra.

The rocking vibrations of —CH$_2$ can be observed in the wavenumber region of about 757-755 cm$^{-1}$. The IR spectra also show characteristic absorption bands of a phenyl ring in the styrene. The C=C stretching vibrations of a phenyl ring appear in the wavenumber region of about 1591-1604 cm$^{-1}$. The —C—H deformation vibrations of ring hydrogens are found by noticing two relatively sharp signals occurring at 755 cm$^{-1}$ and 704 cm$^{-1}$. The IR absorption peaks found at about 3060 cm$^{-1}$ and about 3027 cm$^{-1}$ are assigned to —C—H stretching vibrations of ring hydrogens. The overtone and combination bands of —C—H deformation vibrations are found in the wavenumber region of about 1660 cm$^{-1}$ to about 2000 cm$^{-1}$.

Example 4

Differential Scanning Calorimetry (DSC) Analysis

Figure 2:
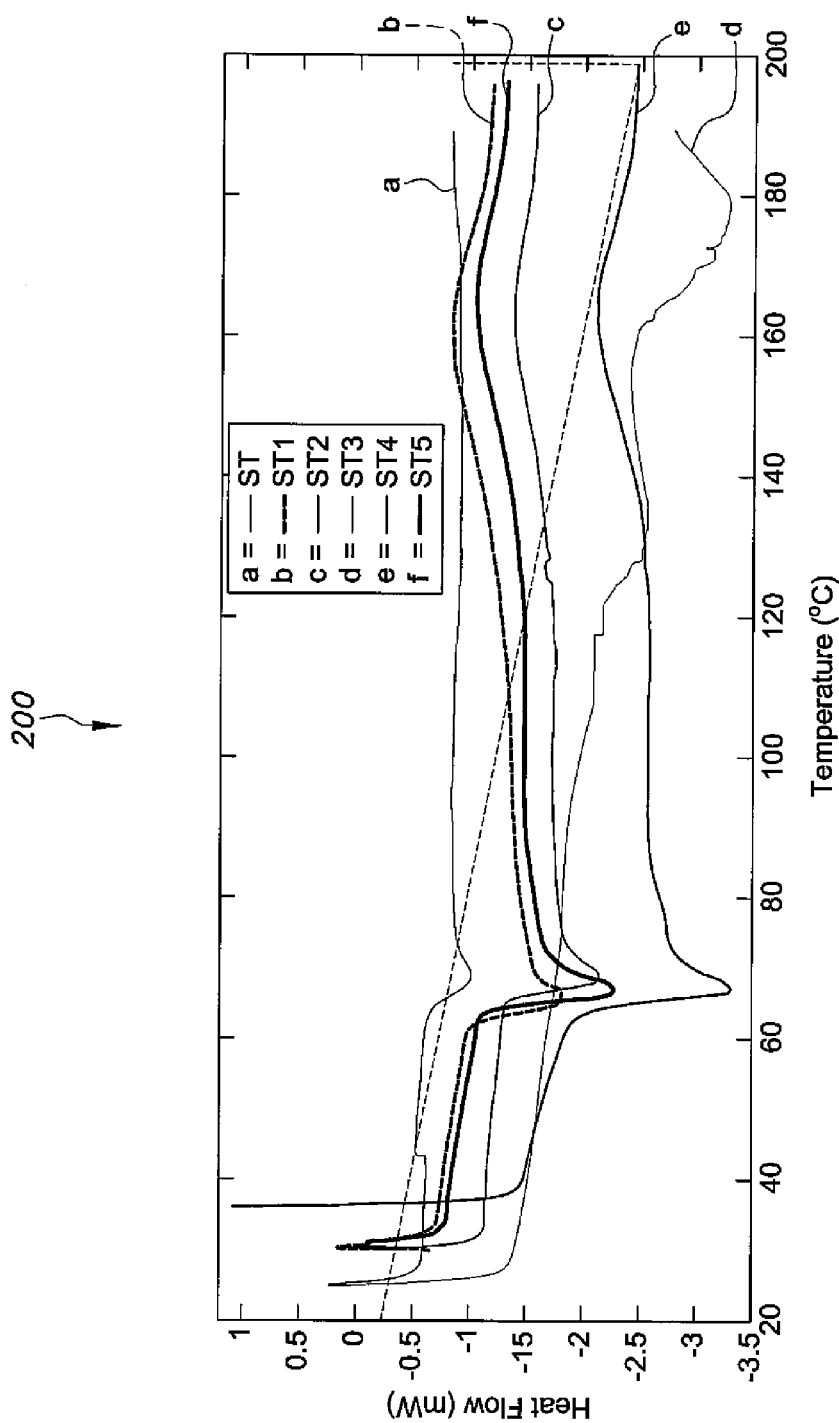
FIG. 2 is a chart of Differential Scanning Calorimetry (DSC) measurements of pure polystyrene and samples of Arabian asphaltene reinforced polystyrene composites according to the present invention at different filler concentrations.

The glass transition temperature of pure polystyrene and the sample polystyrene composites prepared as described in Example 2 and summarized in Table 1 were measured using DSC, as shown in FIG. 2. DSC was performed using a Perkin-Elmer DSC-Diamond. About 10 mg of each sample was weighed, put into the standard Perkin-Elmer sample pan, sealed, and placed into the appropriate position of the instrument. Subsequently, each sample was initially heated to 180° C. at a rate of 10° C. min$^{-1}$ to ensure complete polymerization of the residual monomer. Thereafter, the sample was cooled to 0° C., and the glass transition temperature was measured by heating again to 180° C. at a rate of 20° C. min$^{-1}$.

It is inferred from the superimposed curves on the DSC plot 200 that all samples had nearly equal $T_g$ values, since no significant differences were observed in the values of their glass transition temperature. The melting temperature of the ST sample was generally found to be the highest, and the remaining samples ST1-ST5 having asphaltene fillers were shown to have lower $T_g$ values. This phenomenon may possibly be explained by the fact that the ST sample had least mobility, since its chains were more intermingled, leading to more interactions in the polymer chains, and hence to a higher melting temperature. The addition of asphaltene filler leading to a lower $T_g$ may be explained by its molecules sitting in between the chains, decreasing friction between these chains and causing roller actions, leading to a lower $T_g$.

Further, the crystallization temperature ($T_c$) of the ST2 sample was found to be the highest at a temperature of about 70° C. On the other hand, the ST3 sample was shown to have the lowest crystallization temperature at about 63° C. The relatively higher temperature in the ST2 sample may be attributed to the addition of the asphaltene filler, which could have affected the decrease in the mobility of the polymer chains or might have interrupted its ordered settling, which leads to a higher crystallization temperature. The ST2 composite also had an improved polymer/plasticizer ratio while having a lower $T_c$ value, which can signify easier polymerization processing. A lower $T_c$ may indicate a faster crystallization, which translates into a shorter time period, and therefore a quicker processing cycle, which may lead to increased profits.

Example 5

Thermogravimetric Analysis (TGA)

Figure 3:
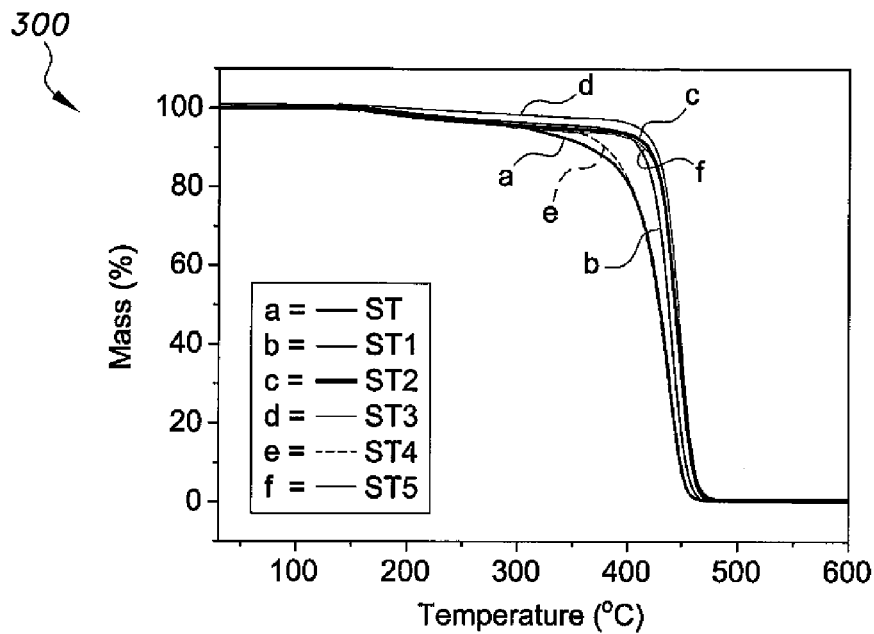
FIG. 3 is a chart of Thermogravimetric Analysis (TGA) mass loss measurements of pure polystyrene and samples of Arabian asphaltene reinforced polystyrene composites according to the present invention at different filler concentrations.
Figure 4:
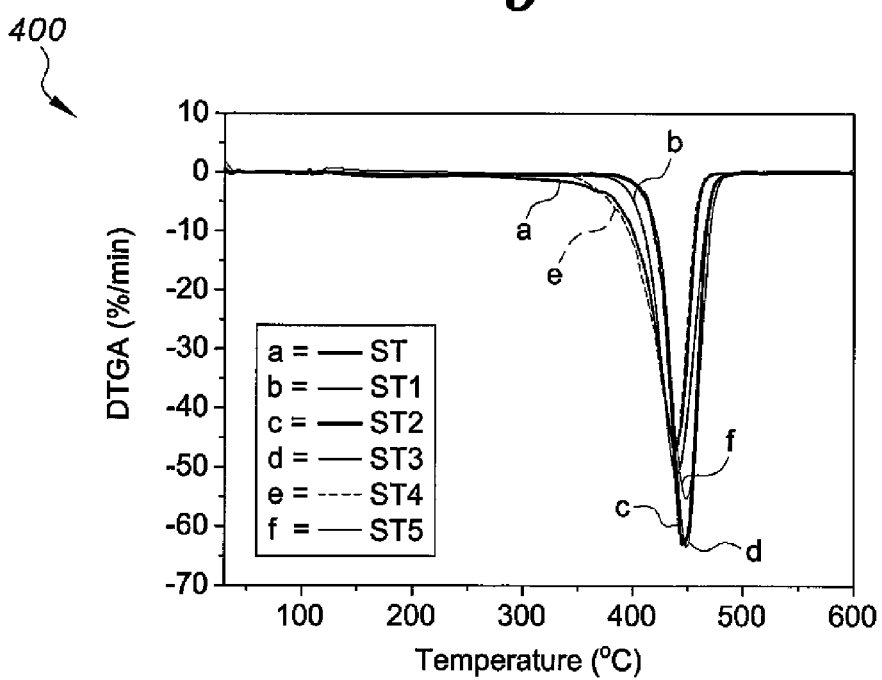
FIG. 4 is a chart of the first derivative (DTG) curve of the TGA curve of FIG. 3, showing the rate of change of mass loss.

The thermal degradation of pure polystyrene and the sample polystyrene composites prepared as described in Example 2 and summarized in Table 1 were measured using TGA. TGA was performed on a Perkin-Elmer Pyris 1 TGA thermal analyzer equipped with a sample pan made of platinum. Samples of about 5-8 mg each were used. The samples were heated from ambient temperature to 600° C. at a heating rate of 10° C./min under a 20 ml/min nitrogen gas flow. Superimposed TGA curves showing the mass loss and thermal degradation (first derivative of the mass loss showing the rate of change of mass loss or DTG curve) are shown in plot 300 of FIG. 3 and plot 400 of FIG. 4, respectively.

The neat ST sample had a ($T_o$) value of 407° C. The ST2 sample had the highest $T_o$ value at about 430° C. The $T_o$ value of the remaining samples (ST1, ST3, ST4, and ST5) showed almost equal amounts of degradation. The ST2 and ST3 samples displayed higher stability at the same temperature to which all samples were subjected. This shows that the thermal stability of samples ST2 and ST3 is higher, compared to that of the ST sample. From FIGS. 3 and 4, it is clear that the thermal stability of the Arabian asphaltene reinforced polystyrene composites ST1-ST5 are improved, compared to the neat polystyrene sample ST, as shown by a shifting of the degradation curve to higher temperatures. The origin of this increase in the decomposition temperatures may be attributed to the ability of asphaltene to obstruct volatile gas produced by thermal decomposition. Accordingly, thermal decomposition begins from the surface of the composites, leading to an increase of the asphaltene contents and the formation of a 'protection layer' by the clay. This so-called 'barrier model' may work well for char-forming polymers.

Example 6

Dynamic Mechanical Analysis (DMA)

The pure polystyrene and the sample polystyrene composites prepared as described in Example 2 and summarized in Table 1 were evaluated by Dynamic Mechanical Analysis (DMA) or Dynamic Mechanical Thermal Analysis (DMTA). Thermal mechanical tests were done using a Perkin-Elmer Diamond DMA Technology SII dynamic mechanical analysis instrument operated in sinusoidal three-point bending mode. The vibration frequency was 1 Hz, the stress 4000 mN, and the amplitude 10 mμ. The temperature was varied from 25 to 130° C. with a scanning rate of 3° C./min in a nitrogen atmosphere. Rod-like specimens were prepared with dimensions 2×2×40 mm. The storage modulus (the in-phase component of a DMA signal, providing a measure of the elastic response to stress applied by a cyclic load) is designated by E', the loss modulus (the out-of-phase component of a DMA signal, providing a measure of the viscous response to stress applied by a cyclic load) by E", and the phase angle by tan δ=E"/E' (also referred to as damping, providing a measure of energy dissipation or absorption by a material under cyclic load).

Figure 5:
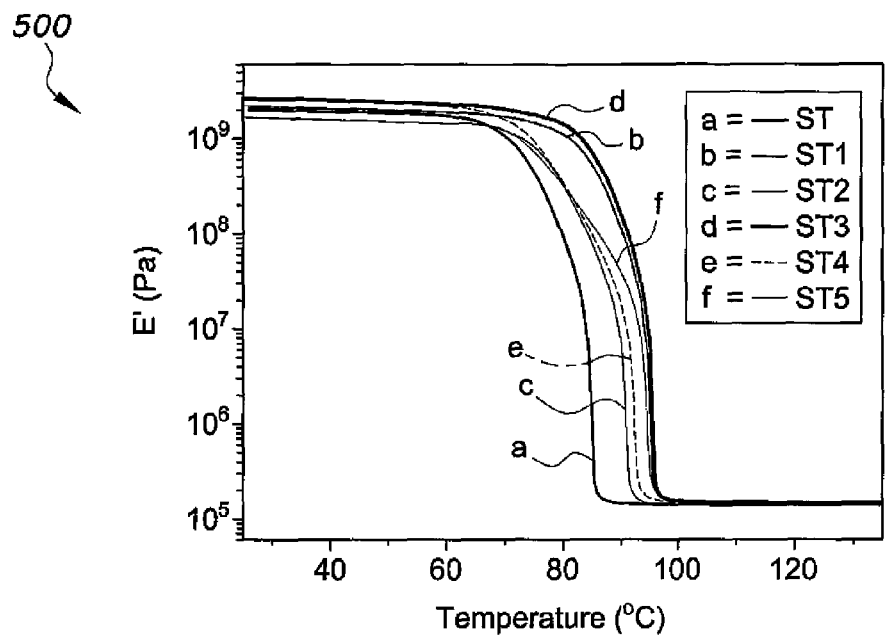
FIG. 5 is a chart of Dynamic Mechanical Analysis (DMA) experimental measurements showing the storage modulus E' of pure polystyrene and samples of Arabian asphaltene reinforced polystyrene composites according to the present invention at different filler concentrations.

Table 2 summarizes the characteristic thermal transitions estimated from the peak in tan δ, shown in plot 700 of Fig, 7, The ST1, ST3, and ST5 sample composites showed the highest glass transition temperatures, at 97° C., 96.5° C., and 96.7° C., respectively, which are observed to be higher than the pure polystyrene analogue, sample ST. As shown in plot 500 of FIG. 5, the storage modulus values E' remained almost constant in a plateau region below the glass transition temperature. The storage modulus E' for the ST3 sample composite was highest, as compared to the pure polystyrene sample ST. This can be attributed to crosslinking between the chains of the polymer due to the addition of the asphaltene reinforcement.

TABLE 2

Characteristic thermal transitions estimated from peak in tan δ

| Sample | Glass Transition Temperature Tg (° C.) |
|---|---|
| ST | 87 |
| ST1 | 97 |
| ST2 | 92 |
| ST3 | 96.5 |
| ST4 | 94 |
| ST5 | 96.7 |

Figure 6:
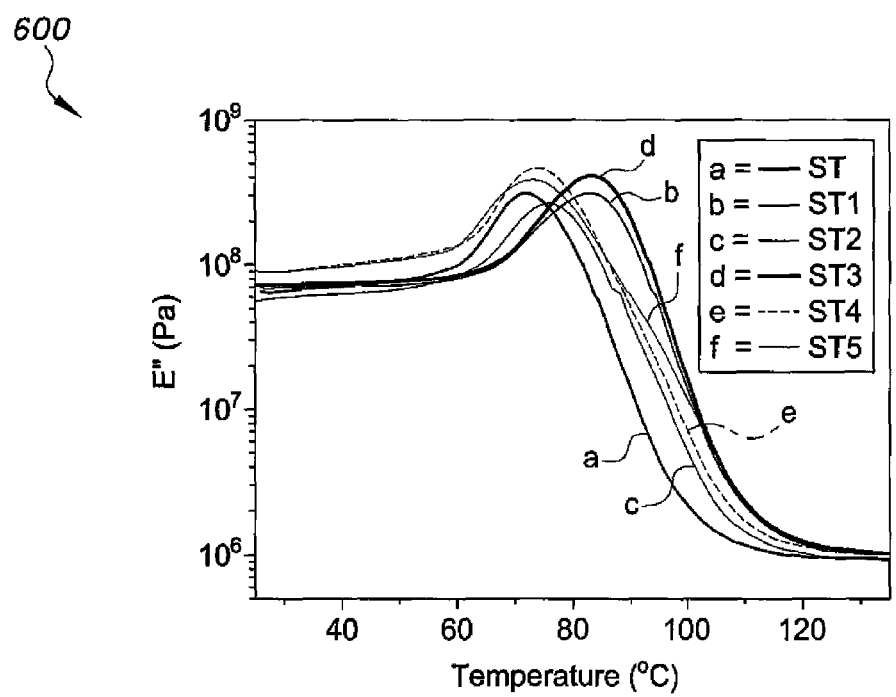
FIG. 6 is a graph of DMA experimental measurements showing the loss modulus E" of pure polystyrene and samples of Arabian asphaltene reinforced polystyrene composites according to the present invention at different filler concentrations.
Figure 7:
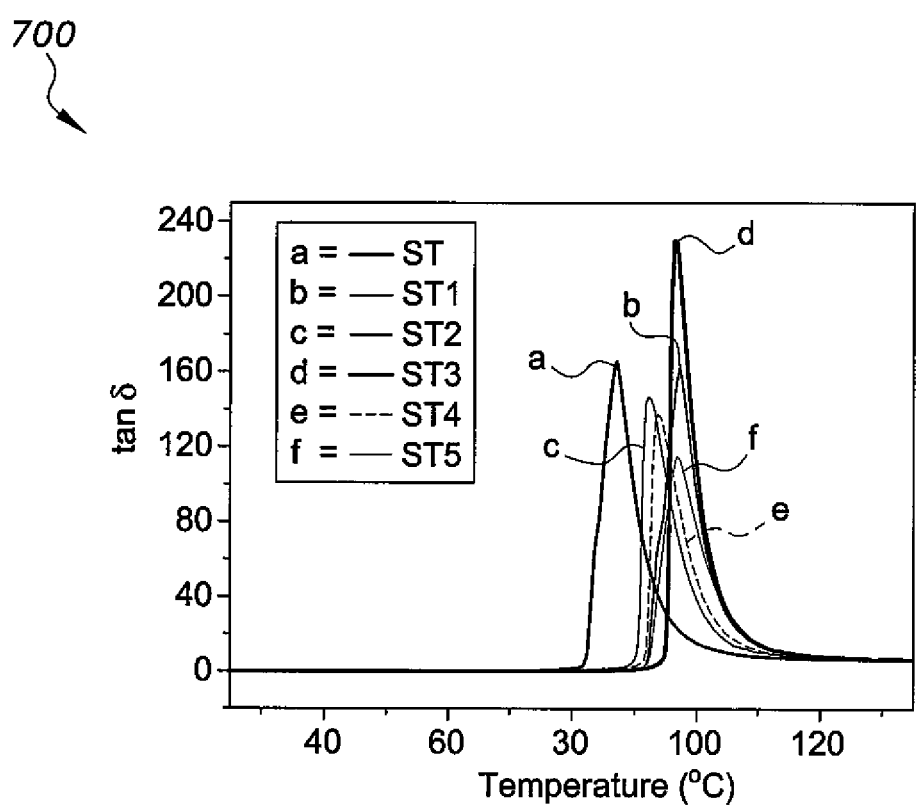
FIG. 7 is a chart of DMA experimental measurements showing a phase angle tan δ (the damping, or E"/E') of pure polystyrene and samples of Arabian asphaltene reinforced polystyrene composites according to the present invention at different filler concentrations.

The sample composite ST3 shows a higher storage modulus as compared to the other samples, a higher melting temperature, and also the best flexural strength. Sample ST3 also displays the lowest loss modulus, as shown in plot 600 of FIG. 6, so that it will require the least amount of energy during processing.

Thus, the addition of asphaltenes reinforcement improves the storage modulus of polystyrene due to the compatibilization effect that facilitates load transfer. In summary, the Arabian asphaltene reinforced polystyrene composites exhibit better thermal stability and viscoelastic properties than pure polystyrene polymer.

It is to be understood that the present invention is not limited to the embodiments described above, but encompasses any and all embodiments within the scope of the following claims.

I claim:

1. An asphaltene reinforced polystyrene composite, comprising:
   a matrix of polystyrene; and
   asphaltene filler homogenously dispersed throughout the polystyrene matrix, wherein the asphaltene filler comprises asphaltenes isolated from Arabian crude oil.

2. A method of making an asphaltene reinforced polystyrene composite, comprising the steps of:
   mixing asphaltenes with styrene monomer; and
   polymerizing the mixture of asphaltenes and styrene in situ.

3. The method of making an asphaltene reinforced polystyrene composite according to claim 2, wherein the step of polymerizing the mixture of asphaltenes and styrene in situ further comprises the step of heating the mixture of asphaltenes and styrene to initiate polymerization.

4. The method of making an asphaltene reinforced polystyrene composite according to claim 2, wherein the step of polymerizing the mixture of asphaltenes and styrene in situ further comprises the step of polymerizing the mixture of asphaltenes and styrene at a temperature 120-130° C.

5. The method of making an asphaltene reinforced polystyrene composite according to claim 2, further comprising the step of isolating the asphaltenes from crude oil.

6. The method of making an asphaltene reinforced polystyrene composite according to claim 5, wherein the crude oil comprises Arabian crude oil.

7. The method of making an asphaltene reinforced polystyrene composite according to claim 5, wherein the step of isolating the asphaltenes further comprises the steps of:
   heating a mixture of the crude oil with n-heptane at 90° C. with continuous stirring to extract the asphaltenes into the n-heptane, forming a residue solution;
   covering the residue solution and cooling the covered residue solution at room temperature for about 24 hours to precipitate asphaltenes in the n-heptane;
   filtering the precipitated asphaltenes from the residue solution;
   washing the filtered asphaltenes with n-heptane until the filtered asphaltenes are colorless in order to remove traces of maltenes from the asphaltenes; and
   drying the washed asphaltenes at 105° C. until the asphaltenes attain constant weight.

* * * * *